Jan. 5, 1943.　　　　J. C. PLASTARAS　　　　2,307,072
TYPOGRAPHICAL COMPOSING, CASTING, AND DISTRIBUTING MACHINE
Filed Oct. 24, 1941　　　13 Sheets-Sheet 1

INVENTOR
James C. Plastaras
BY Morrison, Kennedy & Campbell
ATTORNEYS

Jan. 5, 1943.    J. C. PLASTARAS    2,307,072
TYPOGRAPHICAL COMPOSING, CASTING, AND DISTRIBUTING MACHINE
Filed Oct. 24, 1941    13 Sheets-Sheet 4

Jan. 5, 1943. J. C. PLASTARAS 2,307,072
TYPOGRAPHICAL COMPOSING, CASTING, AND DISTRIBUTING MACHINE
Filed Oct. 24, 1941 13 Sheets-Sheet 7

INVENTOR
James C. Plastaras
BY Morrison, Kennedy & Campbell
ATTORNEYS

Jan. 5, 1943. J. C. PLASTARAS 2,307,072
TYPOGRAPHICAL COMPOSING, CASTING, AND DISTRIBUTING MACHINE
Filed Oct. 24, 1941 13 Sheets-Sheet 8
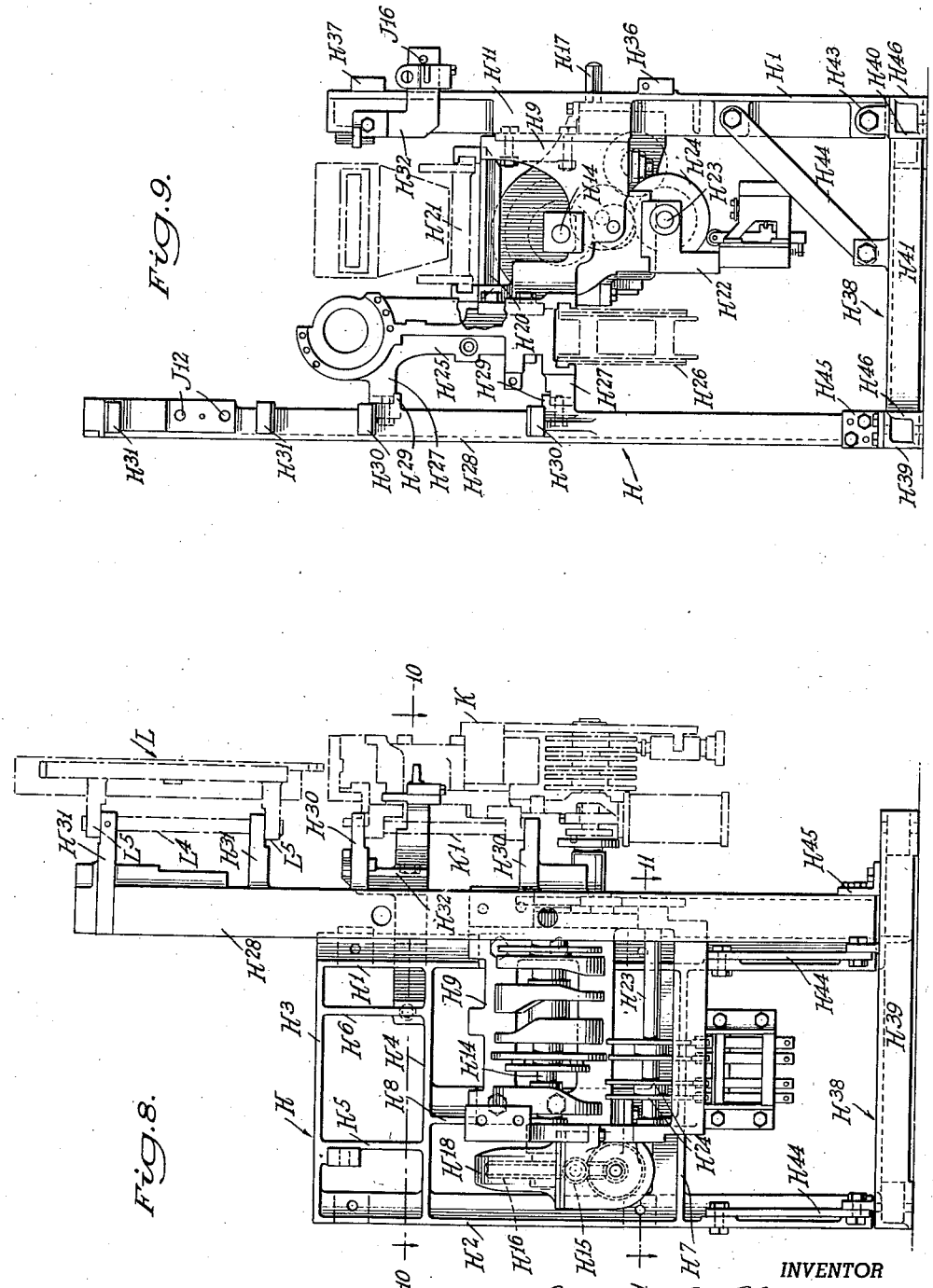
INVENTOR
BY *James C. Plastaras*
*Morrison, Kennedy & Campbell*
ATTORNEYS Jan. 5, 1943. J. C. PLASTARAS 2,307,072
TYPOGRAPHICAL COMPOSING, CASTING, AND DISTRIBUTING MACHINE
Filed Oct. 24, 1941 13 Sheets-Sheet 9

INVENTOR
James C. Plastaras
BY
Morrison, Kennedy & Campbell
ATTORNEYS

Jan. 5, 1943. J. C. PLASTARAS 2,307,072
TYPOGRAPHICAL COMPOSING, CASTING, AND DISTRIBUTING MACHINE
Filed Oct. 24, 1941 13 Sheets-Sheet 12

INVENTOR
James C. Plastaras
BY Morrison, Kennedy & Campbell
ATTORNEYS

Patented Jan. 5, 1943

2,307,072

UNITED STATES PATENT OFFICE 2,307,072

TYPOGRAPHICAL COMPOSING, CASTING, AND DISTRIBUTING MACHINE

James C. Plastaras, Laurelton, N. Y., assignor to Mergenthaler Linotype Company, a corporation of New York Application October 24, 1941, Serial No. 416,325

26 Claims. (Cl. 199—11)

This invention relates to typographical composing, casting and distributing machines, such as "Linotype" machines of the general organization represented in Letters Patent of the United States No. 436,532 to O. Mergenthaler, wherein circulating matrices are released from a magazine in the order in which their characters are to appear in print and then assembled in line, the composed line transferred to the face of a slotted mold, the mold filled with molten metal to form a slug or linotype against the matrices which produce the type characters thereon, and the matrices thereafter elevated and returned through distributing mechanism to the magazine from which they started.

Heretofore, commercial machines of the above type have been built with large ponderous base castings which give support to all the machine elements, either directly or through bracket castings of one type or another mounted directly upon the base castings. The castings were necessarily heavy because of the weight they supported and also to enable them to absorb the stresses set up during the operation of the machine. Such stresses are substantial since practically all of the moving parts of the machine are operated through ponderous levers from the large heavy cam assembly, the shaft of which, as well as the shaft bearings, are subjected to a multiplicity of simultaneously acting forces due, of course, to the fact that, during a casting cycle, many machine organs function at the same time. Indeed, it might be said that the commercial "linotype" machine and its ectypes are built around the heavy cam shaft, and that is one reason why the supporting castings are of such a complicated nature.

In the improved machine forming the subject of the instant invention, the heavy cam shaft has been eliminated, and, in substantially all cases, the power and motion transmitting elements are located up close to the machine organs which they control. In other words, each different function performing organ of the machine has its own individual power unit located close to it, with the result that all of the large movable parts, such as levers, etc.—that served merely as force or motion transmitting elements—have been eliminated in the new machine.

The detailed design and operation of the various machine organs comprising the improved machine are fully set forth in Plastaras' copending applications S. N. 269,833 filed April 25, 1939, S. N. 311,091 filed December 27, 1939, S. N. 355,434 filed September 5, 1940, S. N. 377,364 filed February 4, 1941, S. N. 383,133 filed March 13, 1941, S. N. 390,558 filed April 26, 1941, S. N. 408,456 filed August 27, 1941, and S. N. 412,144 filed Sept. 24, 1941.

These earlier applications deal chiefly with the mechanism as such, describing the manner in which they operate to carry out their intended functions. Aside from their distinctly novel features as mechanisms per se—however, much inventive thought was involved in their design from a standpoint of economy in manufacture. Thus, for the most part, each organ of the machine is an independent assembly unit, built and tested as such in the factory. Upon the receipt of an order, the independent units can be withdrawn from stock and the complete machine assembled for final testing. Then, depending upon transportation facilities, the machine would either be shipped in assembled condition or in a knocked down condition for later assembly in the field. Assembling in the plant or in the field would be a relatively simple matter, involving merely the bolting or hinging together of the various assemblies, which are relatively few in number, and the connection of the air lines for the supply of air to the power units, which latter are pneumatically operated.

For the most part, too, the different power devices are included as elements of the respective assemblies, their individual frames or supporting structures being designed to take whatever dynamic reactions are involved during machine operation. In consequence, the main supporting elements of the machine need carry weight only, and for this reason may themselves be relatively light in weight. Actually the framework, instead of being a heavy complicated and expensive casting, is a fabrication of relatively light structural steel shapes, welded together in a boxlike frame structure, enabling the machine to be panel encased. Thus, not only is the new machine pleasing in appearance, but in addition, substantially all of the working parts are enclosed, thereby excluding dirt and promoting the safety of the personnel who might otherwise be subjected to the danger of moving machine parts.

The improved machine consists of two main frame sections, if it be equipped with only main magazines, or with three main frame sections if there are auxiliary magazines. Each main frame section is capable of independently supporting the mechanisms and machine organs mounted upon it, and when the frame sections are arranged one alongside the other and bolted together, the whole supporting frame structure of the entire machine will be complete. The center frame section, when assembled, will contain the base element of the magazine shift frame, the pneumatic devices for raising and lowering the shift frame and, perhaps, the mechanism for controlling the operation of the pneumatic devices although that mechanism could be treated as an independent assembly unit. At the bottom of the center frame section, as part of the assembly, there is mounted the air compressor together with a motor for driving it and a water tank and pump which form part of the mold cooling system. The center frame assembly also includes a portion of a driving shaft for operating various elements of the machine as will be described later on.

The units that are mounted upon the center frame section as sub-assemblies include the keyboard mechanism, the reed assembly, assembler throat mechanism, the distributor mechanism, the second elevator mechanism, and of course, the magazines with their base frames which are arranged in superposed relation upon the base element of the shift frame.

When the machine is to be equipped with auxiliary magazines, a separate main frame section for their support is arranged at the right of the center main frame section and is bolted thereto. This second frame section, as an assembly unit, will include the auxiliary magazine shift frame without the magazines, the pneumatic devices for operating the shift frame and the control mechanism for the pneumatic devices. In addition, it will include a section of the main drive shaft which, when the main frame sections are bolted together, will be in axial alignment with that portion of the drive shaft carried by the center frame supporting the main magazines. When the machine is assembled, there will be mounted on the second frame section, as independent assembly units, the reed assembly for releasing matrices from the auxiliary magazines, that portion of the assembler throat which cooperates with the auxiliary magazines and, of course, the auxiliary magazines themselves. In addition, this same frame section will give support to the distributor mechanism at one end since, in a machine equipped with auxiliary magazines, the distributor is long enough to distribute matrices to the auxiliary magazines as well as to the main magazines.

A third main frame section is arranged at the left alongside the center frame section and supports the casting unit of the machine. As an assembly unit, it will include the cam shaft, which in this machine is primarily a timing device, its bracket support, a portion of the main shaft from which the cam shaft is driven and which will be in axial alignment with that portion of the main shaft mounted in the center frame section, and a bracket for supporting the mold arm rock shaft. This third main frame section is bolted to the center main frame section and its sub-assemblies mounted on it. These sub-assemblies include the vise frame assembly, the first elevator assembly, the metal pot, the metal pump assembly, the mold arm rock shaft, the ejector mechanism and the mold magazine.

The front plate is a relatively long fabricated steel frame section which is bolted at its opposite ends respectively, to the center and the casting assembly units. It is a sub-assembly in itself and supports the transfer mechanisms for delivering a composed line to the first elevator and for transferring the line after the casting operation from the first to the second elevator preparatory to distribution.

As previously stated, all of the sub-assemblies are complete in themselves and require merely the brief operation of attaching them to the main frame assemblies when a complete machine is assembled.

Referring to the drawings:

Fig. 8 is a left side elevation of the left main frame section which supports the casting mechanism;

Fig. 9 is a front elevation of the assembly shown in Fig. 8;

Figure 1:
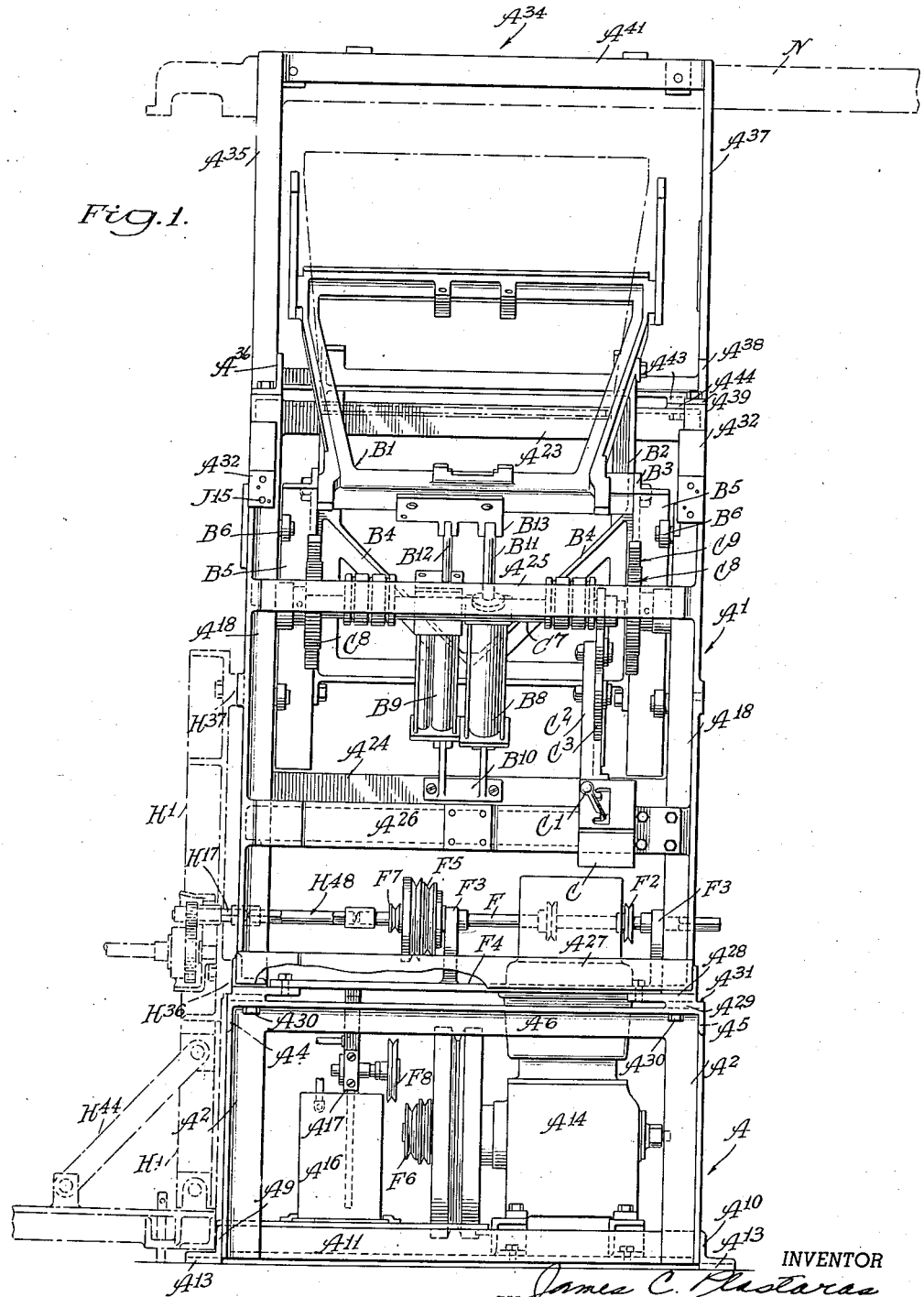
Fig. 1 is a front elevation of the center main frame assembly built according to the present invention.

The machine depicted in the drawings is made up of a casting unit at the left, a main magazine unit in the center, and an auxiliary magazine unit at the right.

*Center or main magazine unit*

Figure 2:
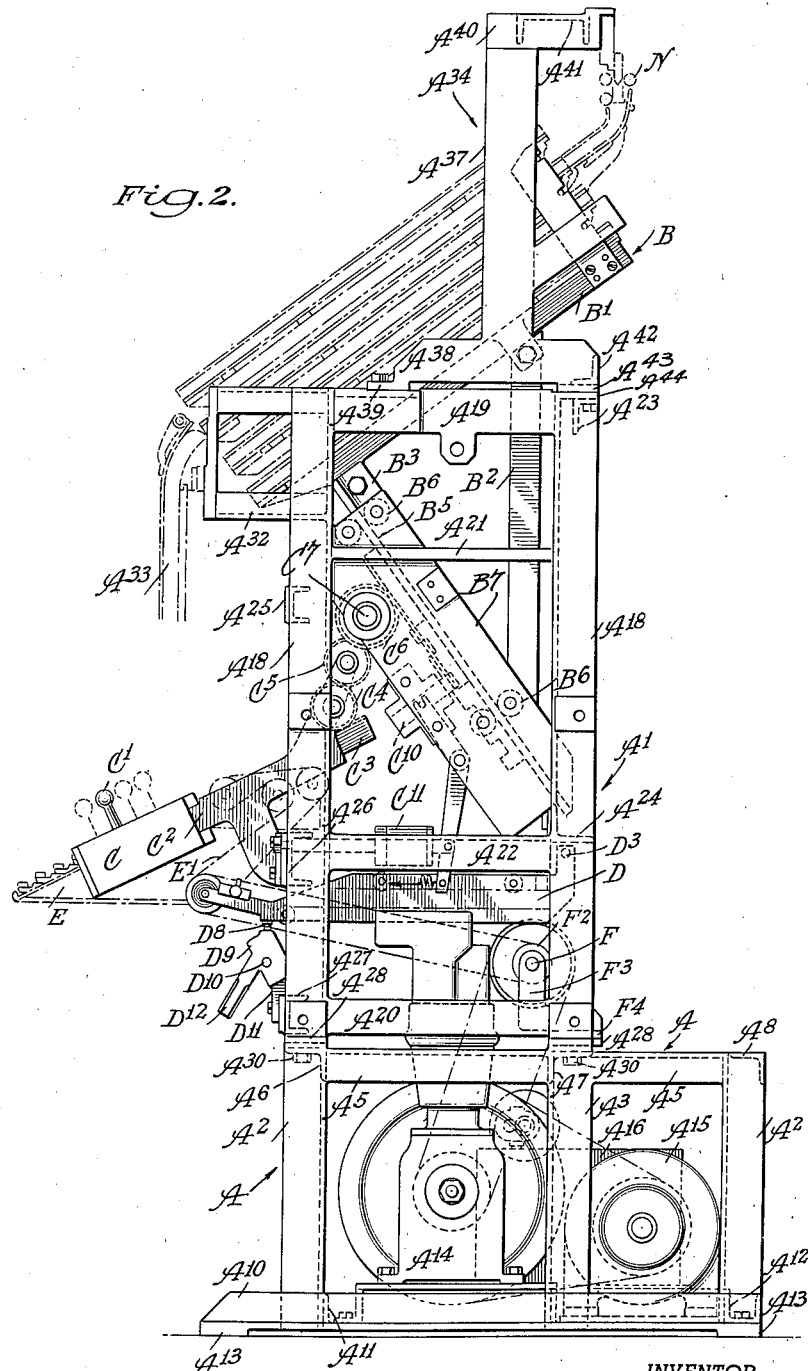
Fig. 2 is a right side elevation of the main frame assembly shown in Fig. 1.

As shown in Figs. 1 and 2, the center or main magazine unit includes a main frome section comprising a base frame A and an upper frame $A^1$ supported thereon. The base frame A is of box-like construction, consisting of four corner columns $A^2$ with intermediate columns $A^3$ at each side. The columns are joined together at the top by horizontal lateral frame members $A^4$ and $A^5$ and by horizontal transverse frame members $A^6$, $A^7$ and $A^8$. The columns are also joined together at the bottom by horizontal lateral frame members $A^9$ and $A^{10}$ and by horizontal transverse members $A^{11}$ and $A^{12}$. All frame members are structural angles, except the rear transverse member $A^{12}$ which is a channel, and all the joints are welded so that a base frame unit of substantial strength results. The lateral or fore-and-aft base members $A^9$ and $A^{10}$ have pads $A^{13}$ welded at their front and rear ends so that the frame will rest firmly upon the floor at its four corners.

As previously stated, the various function performing organs of the instant machine are pneumatically operated. Air for the purpose is supplied by an air compressor $A^{14}$ driven by an electric motor $A^{15}$, both units forming part of the base frame assembly and being mounted on suitable supports secured to certain of the horizontal frame members of said assembly (Figs. 1 and 2). Also included as part of the base assembly is a water tank $A^{16}$ and a pump $A^{17}$ mounted thereon, the tank and pump forming part of a water circulating system for cooling the mold. For details of the mold cooling system, reference may be had to the copending Plastaras application Ser. No. 365,434.

The upper frame $A^1$ likewise includes four corner columns $A^{18}$ joined together by top and bottom horizontal side frame members $A^{19}$ and $A^{20}$ and intermediate side frame members $A^{21}$ and $A^{22}$, the positions of which are determined by the location of certain of the machine parts which they are intended to support. At the rear, the columns are joined together by a transverse frame member $A^{23}$ at the top and, nearer the bottom, by a transverse frame member $A^{24}$. There are three transverse members $A^{25}$, $A^{26}$ and $A^{27}$ joining the columns together at the front, the location of these members likewise being determined by the machine parts they are intended to support. The frame members $A^{25}$, $A^{26}$ and $A^{27}$ are channels and the two side frame members $A^{21}$ and $A^{22}$ are bars. All remaining frame members including the columns are angles, and all joints are welded, giving a frame of substantial strength.

The upper frame $A^1$ is supported by the lower frame A at its four corners and in order to secure plumbness as between the frames, there is a pad $A^{28}$ welded to the frame $A^1$ at each of its four lower corners and a similar pad $A^{29}$ welded at the top of the frame A to cooperate therewith, the contiguous faces of the pads being machined. The frames are fastened together by machine screws $A^{30}$ passing upwardly through the top frame elements $A^5$ of the base frame and threaded into the pads $A^{28}$. It will be observed that the lower frame A is slightly wider than the upper frame $A^1$ so as to present shoulders $A^{31}$ for a purpose referred to later on.

Extending forwardly from each of the front columns $A^8$ near the top, is a bracket $A^{32}$ to serve as a support for the assembler throat $A^{33}$ shown in phantom lines in Fig. 2. Each bracket consists of a pair of vertically spaced horizontally disposed angles welded to the adjacent column and a vertical bar welded, at its opposite ends, to the angles.

At the top of the frame $A^1$, there is a support $A^{34}$ for the distributor mechanism. The support $A^{34}$ comprises two standards, one, i. e., that at the left, consisting of a vertical channel member $A^{35}$ welded to a fore-and-aft angle foot piece $A^{36}$ which is bolted to the top side frame member $A^{19}$ at the left. The standard at the right consists of a vertical member $A^{37}$ and a fore-and-aft foot piece $A^{38}$, both being of bar stock welded together, the fore-and-aft foot piece $A^{38}$ presenting a flat ear $A^{39}$, at its front end, drilled to facilitate bolting it to the top side frame member $A^{19}$ at the right. Both standards have rearwardly extending members $A^{40}$ at the top which are welded thereto and which are connected by a transverse channel $A^{41}$ welded at its ends to said members. The standards $A^{35}$ and $A^{37}$ are also connected together at the bottom by a transverse angle $A^{42}$ welded to the footings $A^{36}$ and $A^{38}$ at their rear ends. Again to insure plumbness, there is welded to the transverse angle $A^{42}$ adjacent its ends, a pad $A^{43}$ having its bottom face machined to contact with the machined upper face of a similar pad $A^{44}$ welded one to each rear corner column $A^{19}$ at the top. The attachment is effected by machine screws, passing upwardly through the pads $A^{44}$ and threaded into the pads $A^{43}$.

In addition to the structural elements themselves, the upper frame assembly preferably will include the magazine shift frame B, a control device C for effecting the raising and lowering of the shift frame, a supporting frame D for a removable keyboard mechanism E, and a portion of a shaft F from which various elements of the machine are driven.

The magazine shift frame is fully described in the Plastaras copending applications Serial Nos. 311,091 and 390,558. In general, it includes a base member $B^1$ on which the lower magazine rests and two vertical side frame members $B^2$ connected at their upper ends to the base member near the top. The shift frame also includes a pair of side members $B^3$ connected to the members $B^2$ at their lower ends and extending upwardly at an angle to meet perpendicularly the magazine base member to which said members in turn are connected at the top. Transverse struts $B^4$ lend stability to the frame. The members $B^3$ present outwardly extending flanges $B^5$ which ride each between two pairs of anti-friction rollers $B^6$ supported by angularly disposed side plates $B^7$ welded to the corner columns $A^{18}$ and the frame member $A^{21}$ at the corresponding side (Fig. 2). A pneumatically operated cylinder and piston device $B^8$ is employed to raise and lower the shift frame and this together with a hydraulic brake mechanism $B^9$ are connected at their lower ends to the rear transverse frame member $A^{24}$ by means of a bracket $B^{10}$ (Fig. 1). The pneumatic device and the hydraulic brake mechanism include piston rods $B^{12}$ and $B^{11}$ respectively, which are connected at their upper ends to a bracket $B^{13}$ mounted on the magazine base member $B^1$ at the front, the arrangement being such that as air is admitted into the cylinder of the pneumatic device at the bottom, the shift frame will be raised whereas, when the air is admitted at the top, the shift frame will be lowered.

As set forth in the two Plastaras applications last referred to, the raising and lowering of the shift frame is controlled from a handle $C^1$ located in the control box C supported at the front of the machine by a bracket $C^2$ which is bolted to the transverse channel member $A^{26}$. The bracket $C^2$ serves to guide a bar $C^3$ on which the handle is mounted and which is formed in its upper edge with a series of rack teeth connected with the shift frame through a train of gears $C^4$, $C^5$ and $C^6$, two of which are mounted on the bracket and the third on a cross shaft $C^7$ journalled at its opposite ends in the side plates $B^7$ (Fig. 1). At each end of the shaft $C^7$, there is mounted a gear $C^8$ arranged to mesh with a rack bar $C^9$ secured one, to each of the lateral members $B^3$ of the magazine shift frame, the arrangement being such that as the handle $C^1$ is operated to control the movement of the shift frame, it will move in synchronism therewith so that its position, at all times, will give an indication of the magazine in operative position. Thus, if the machine is equipped with four matrix magazines, the handle $C^1$ will have four different positions of adjustment, in any one of which a different magazine will be located in operative position. Also, as described in said Plastaras applications, the shift frame is located in its different operative positions by means of retractible bolts $C^{10}$ operated from a pneumatic power device $C^{11}$ controlled from the same handle $C^1$ and which is mounted upon the transverse frame unit $A^{26}$ (Fig. 2).

Figure 3:
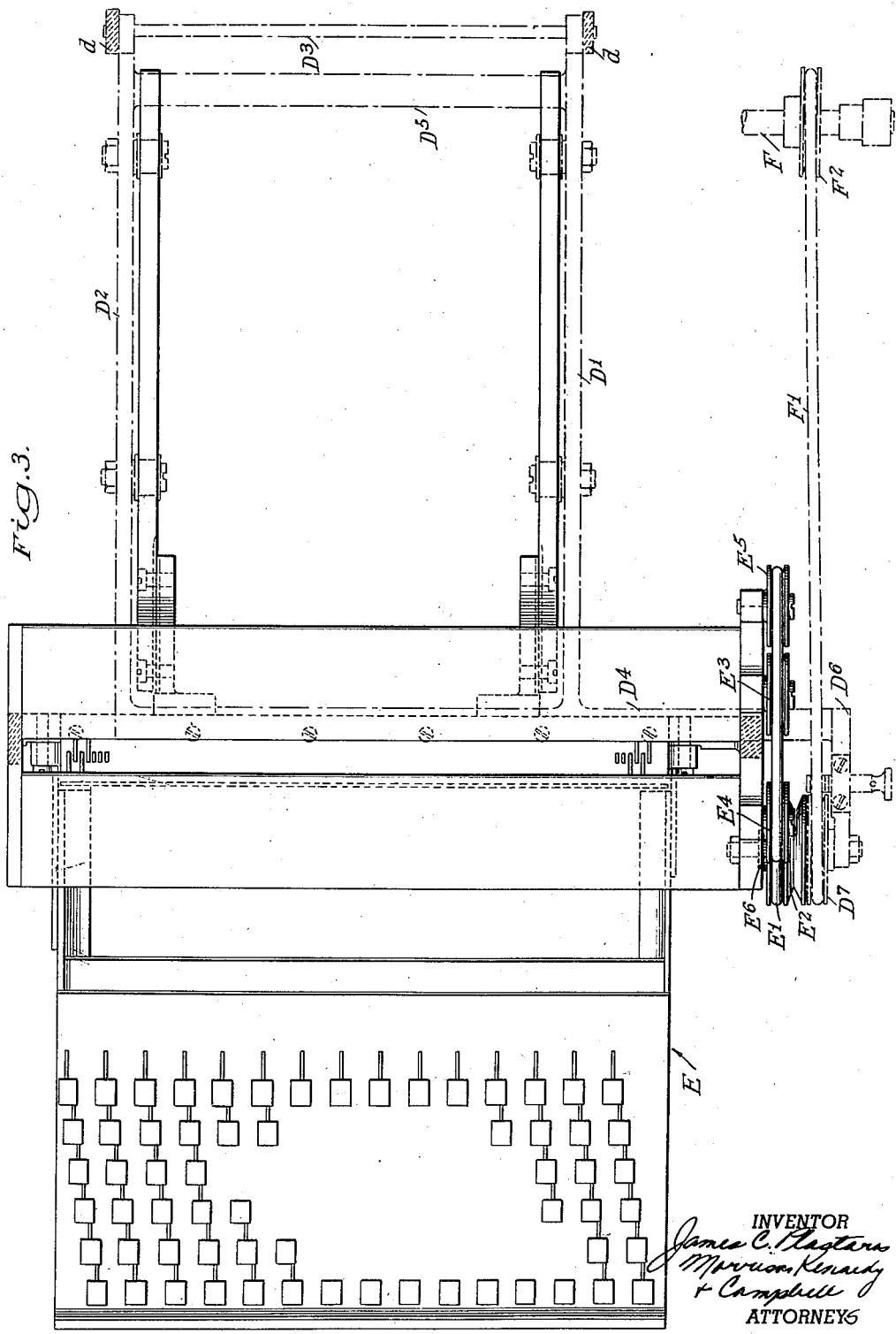
Fig. 3 is a top plan view of the keyboard sub-assembly.
Figure 4:
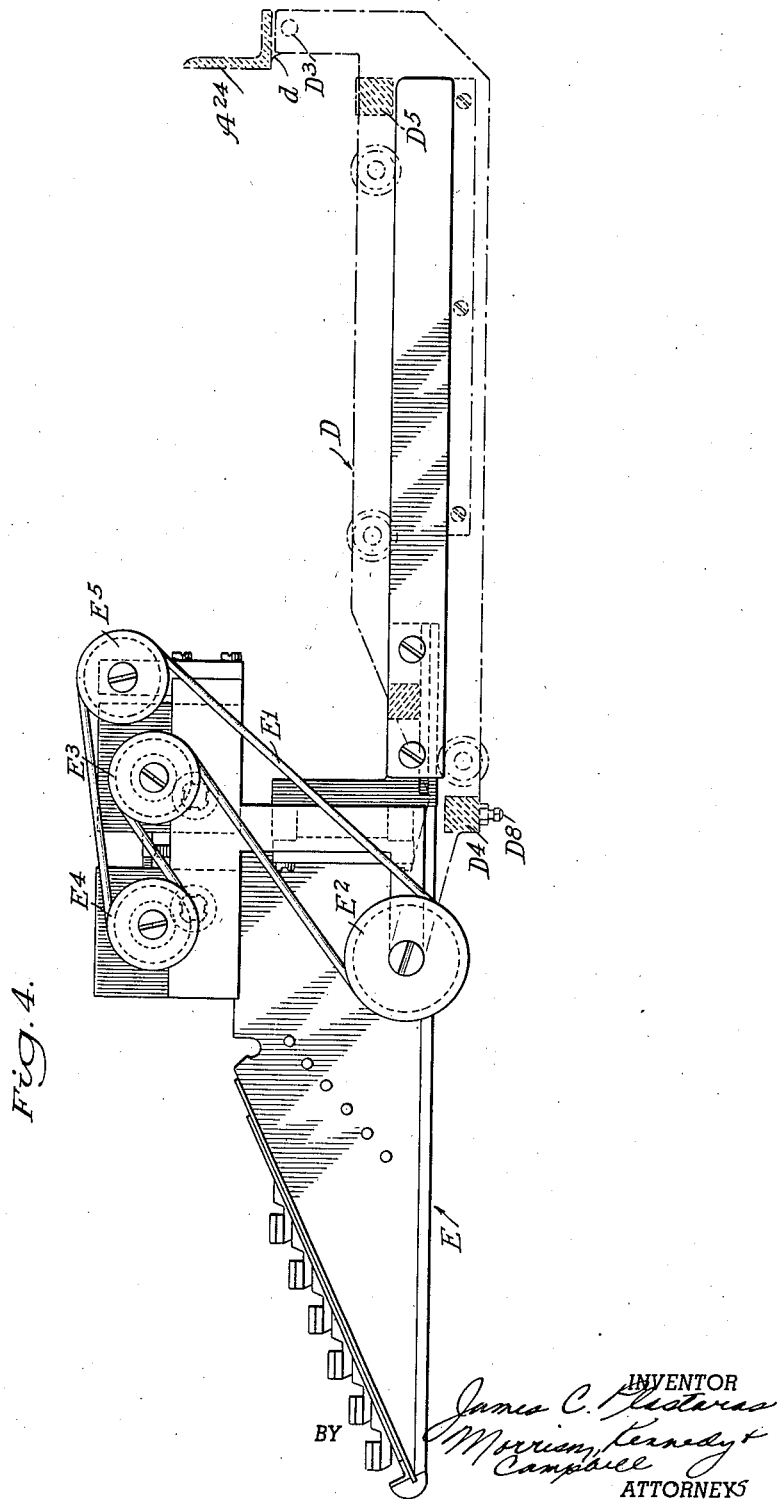
Fig. 4 is a side elevation of the keyboard sub-assembly shown in Fig. 3.

The supporting frame for the keyboard mechanism is best shown in Figs. 2, 3 and 4. It includes a pair of spaced parallel fore-and-aft members $D^1$ and $D^2$, pivotally mounted at their rear ends on a long transverse hinge pin $D^3$ which is supported in lugs $d$ depending from the transverse frame member $A^{24}$ at the rear of the main frame $A^1$. For rigidity, the members $D^1$ and $D^2$ are connected together at the front and at the rear by cross bars $D^4$ and $D^5$, the member $D^4$ at the front extending rightward beyond the keyboard structure and presenting at its end, a forwardly extending arm $D^6$ on which there is mounted an idler pulley $D^7$ driven by a belt $F^1$ connected to a pulley $F^2$ on the drive shaft F.

The keyboard supporting frame D is provided at the front with a pair of spaced banking screws $D^8$, threaded into the cross bar $D^4$ and which rest upon a pair of cam plates $D^9$ correspondingly spaced. The cam plates are fixed upon a transverse rock shaft $D^{10}$ supported in brackets $D^{11}$ bolted to the channel member $A^{27}$, and when the cam plates are in the position shown in Fig. 2, their highest portions are presented to the banking screws $D^8$ to locate the keyboard supporting frame in its normal position. The cam plate $D^9$, at the right, is formed with a handle $D^{12}$ permitting both plates, because of their integral mounting on the transverse shaft $D^{10}$, to be turned in a clockwise direction, looking at the parts from the right, to present lower portions of the cam plates to the banking screws. As described in the copending Plastaras application Serial No. 412,144, this is for the purpose of enabling the keyboard E, which is supported in the frame, to be lowered clear of the overlying escapement reed mechanism, permitting it to be adjusted forwardly out of operative position. And, of course, when the keyboard mechanism is returned to its rearmost or normal position in the frame, the return rotation of the cam plates will raise the frame and restore the keyboard mechanism to its normal operative position with reference to the escapement reed mechanism.

While the keyboard supporting frame D preferably would be included as part of the center main frame assembly, the keyboard mechanism E would not, except in those cases where a machine is shipped as a complete unit. In other words, the keyboard mechanism is a sub-assembly and is shown in Figs. 3 and 4, the details of its construction being fully described in the copending Plastaras application Serial No. 412,144. As pointed out in that application, the keyboard mechanism is driven by an endless belt $E^1$ through a series of four pulleys $E^2$, $E^3$, $E^4$ and $E^5$, one of which, i. e., the pulley $E^2$, may be considered as the driving pulley insofar as the keyboard mechanism itself is concerned. The pulley $E^2$ rotates upon a stub shaft $E^6$ mounted in the keyboard supporting frame and is arranged coaxially with the idler pulley $D^7$ which is driven from the main shaft E. The pulley $E^2$ is formed with a double groove enabling the belt $F^1$ to be shifted from the idler pulley $D^7$ to the pulley $E^2$ to operate the keyboard mechanism and back to the idler pulley again when, for any purpose, it is desired to move the keyboard mechanism forwardly out of its operative position.

The drive shaft F, which preferably would be included as part of the center frame assembly, is mounted in vertical bearing posts $F^3$ supported on a transverse bar $F^4$ which is bolted to inwardly extending portions of the pads $A^{28}$ at the rear bottom of the base frame A (Fig. 1). The shaft F is belt driven from the shaft of the air compressor $A^{14}$ through pulleys $F^5$ and $F^6$ both of which are stepped to allow the drive shaft to be driven at different speeds. Another pulley $F^7$ on the shaft F suffices to belt drive the water pump $A^{17}$ through a pulley $F^8$ when the water cooling system for the mold is used.

*Right or auxiliary magazine unit*

Figure 5:
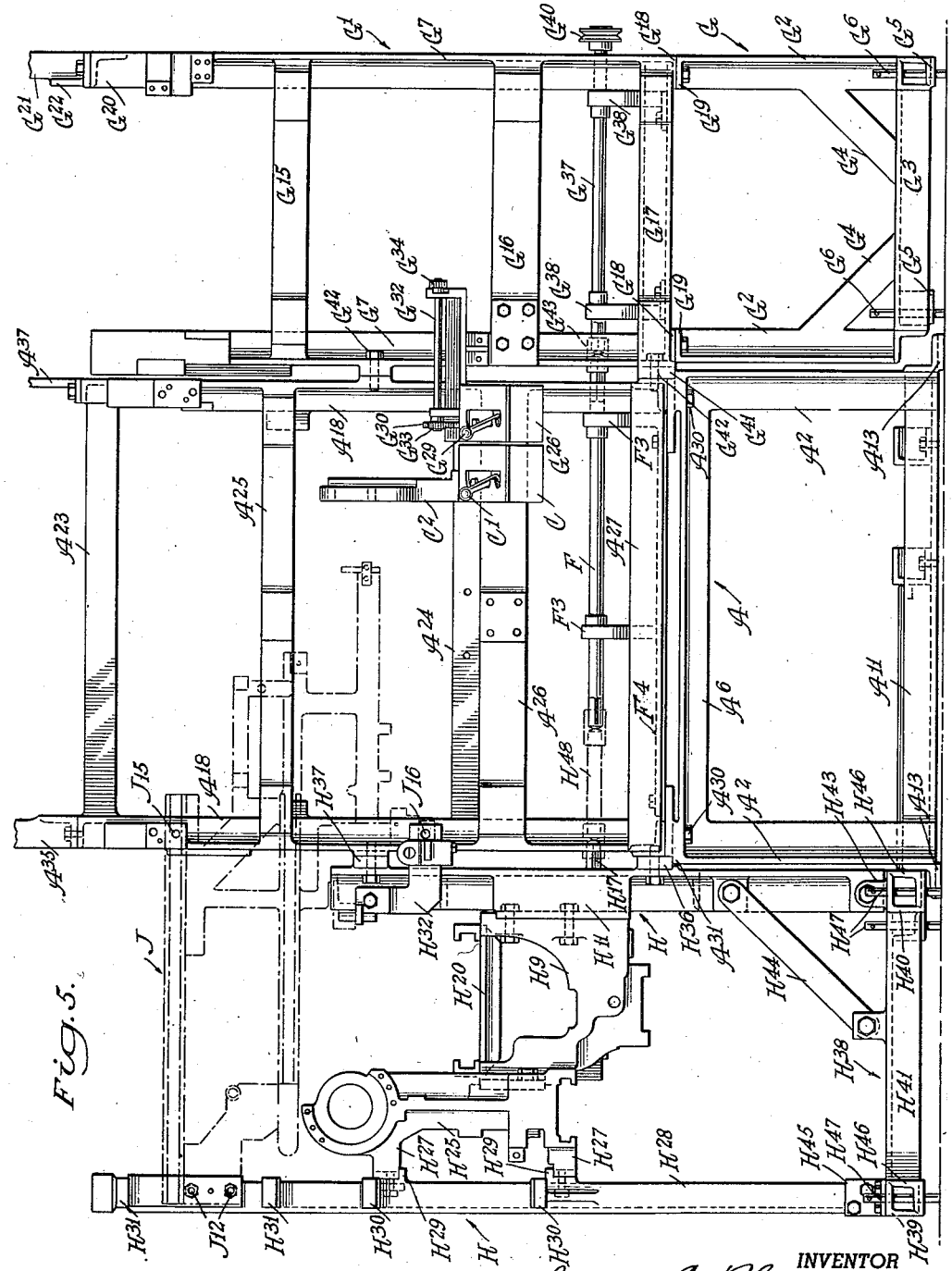
Fig. 5 is a front elevation of the three main frame sections assembled together.
Figure 6:
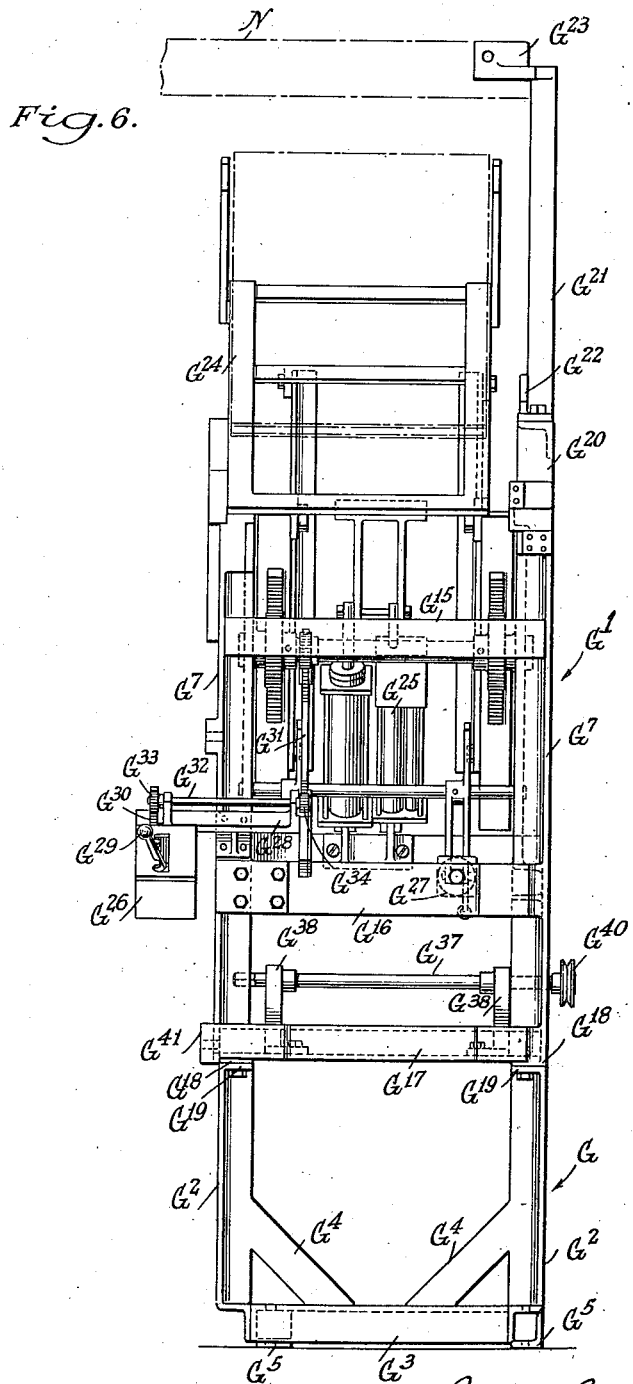
Fig. 6 is a front elevation of the right main frame section which supports the auxiliary magazines.
Figure 7:
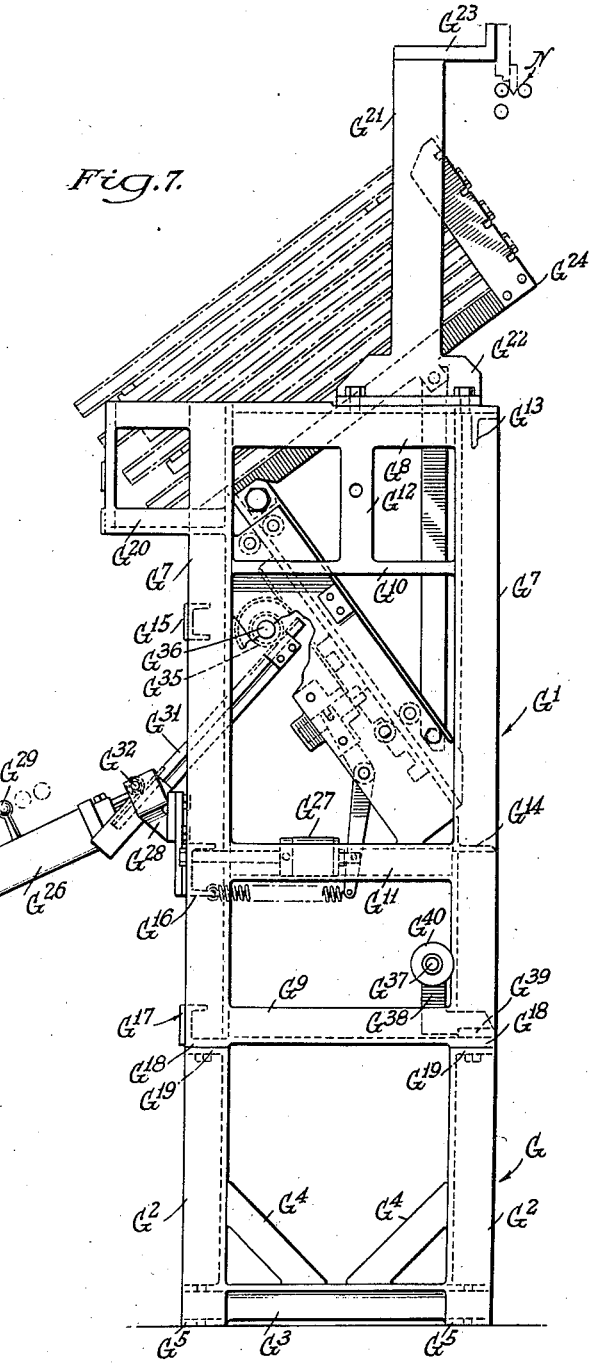
Fig. 7 is a right side elevation of the assembly shown in Fig. 6.

Like the center frame section, the main frame section at the right, which supports the auxiliary magazines, includes a base frame G and an upper frame $G^1$ supported thereon (Figs. 6 and 7). The base frame G includes four corner columns $G^2$ joined together at the bottom by horizontal and transverse frame members $G^3$. In addition, the columns are braced by angularly disposed members $G^4$ welded to the columns and to the bottom frame members $G^3$. With the exception of the bracing members which are bars, all other frame elements are angles, and all joints are welded so as to give a frame structure of substantial strength. Short angle sections $G^5$, inverted with respect to the frame members, are welded thereto so as to present, at all four corners of the frame, short hollow frame portions substantially square in cross-section. These hollow square portions provide spaced bearing sections for corner studs $G^6$ which are threaded vertically therethrough into contact with the floor, the studs being used when necessary during the assembly of the frames G and $G^1$ with the center frame (Fig. 5).

Like the upper frame $A^1$, the frame $G^1$ includes four corner columns $G^7$ joined together, at both sides of the frame, by top and bottom horizontal side frame members $G^8$ and $G^9$ and intermediate side frame members $G^{10}$ and $G^{11}$, the positions of which are determined by the location of certain of the machine parts which they support. The top frame member $G^8$ is joined to the member $G^{10}$ next lower down by a vertical strut $G^{12}$.

At the rear, the columns $G^7$ are joined together by a transverse frame member $G^{13}$ at the top and, nearer the bottom, by a transverse frame member $G^{14}$. There are three transverse members $G^{15}$, $G^{16}$ and $G^{17}$ joining the columns together at the front, the location of these members likewise being determined by the machine parts they are intended to support. The frame members $G^{15}$, $G^{16}$ and $G^{17}$ are channels and the side frame members $G^{10}$ and $G^{12}$ bars. All remaining frame members including the columns are angles and all joints are welded, giving a frame of substantial strength.

The upper frame $G^1$ is supported by the lower frame G and here too, in order to secure plumbness as between the frames, there is a pad $G^{18}$ welded to each corner of the frame $G^1$ at the bottom and with a machined surface facing downwardly to cooperate with a similar pad $G^{19}$ welded to each corner of the frame G at the top, the pads $G^{19}$ having machined surfaces facing upwardly. The frames are connected together by machine screws passing upwardly through the pads $G^{19}$ and which are threaded into the pads $G^{18}$.

Extending forwardly from the right front column $G^7$ near the top, there is a bracket $G^{20}$ which serves as a support for the assembler throat at its extreme right end (Figs. 6 and 7). The bracket consists of a pair of vertically spaced horizontally disposed angles welded to the column and a vertical bar welded, at its ends, to the angles.

At the top of the frame $G^1$ adjacent the right side thereof, there is a support for sustaining the distributor mechanism at its right end. The support comprises a vertical channel member $G^{21}$ welded to a fore-and-aft angle footpiece $G^{22}$ which is bolted to the top side frame member $G^8$ at the right. A rearwardly extending bracket $G^{23}$ welded to the channel $G^{21}$ at the top serves as a means of attaching the distributor to the support.

When the main frame section G, $G^1$ is shipped out for assembly into a completed machine, it is preferred that it include, as part of the assembly, the magazine shift frame $G^{24}$, with its pneumatically operated raising and lowering mechanism $G^{25}$, a control device $G^{26}$ therefor and a pneumatically operated locking bolt mechanism $G^{27}$ for locating the shift frame in its different operative positions. In all substantial respects, the mechanisms just mentioned are the same as the corresponding mechanisms in the center or main magazine unit. A few minor differences are present, namely, in the size of the base members upon which the lowermost magazine rests, which is smaller to accommodate the smaller auxiliary magazines. Also the control device $G^{26}$ is mounted on a bracket $G^{28}$ which is offset to permit the control device to be located immediately adjacent the control device C associated with the main magazines (Fig. 5). The control device $G^{26}$ includes a handle $G^{29}$ by which the shift frame is controlled in the same manner as the handle $C^1$ controls the raising and lowering of the main magazines, the only difference being that, because of its offset position, the intermediate connections between the handle and the shift frame include two rack bars $G^{30}$ and $G^{31}$ spaced apart in a lateral direction but connected for synchronous movement, by a transverse shaft $G^{32}$ equipped at its opposite ends with pinions $G^{33}$ and $G^{34}$ cooperating one with the rack bar $G^{30}$ and the other with the rack bar $G^{31}$. Since the handle $G^{29}$ is arranged to move with the rack $G^{30}$ and since the rack $G^{31}$ cooperates, at its upper end, with a pinion $G^{35}$ mounted on a shaft $G^{36}$ geared for rotation by the shift frame movement, the position of the handle will always correspond with the adjusted position of the shift frame. The frame $G^1$, when assembled, includes a section $G^{37}$ of the transverse drive shaft. It is supported, adjacent its opposite ends, in bearing brackets $G^{38}$ mounted on a bar $G^{39}$ bolted at its opposite ends to the pads $G^{18}$ at the rear of the frame. The shaft section $G^{37}$ is positioned to align with the shaft section F in the center frame when the machine is assembled and, at its right end, there is mounted a pulley $G^{40}$ from which the distributor screws are driven.

The right main frame section and the center main frame section must, of course, be properly located relatively when assembled together. The means for aligning the frame sections in a fore-and-aft direction are not shown, but would include a reference plate on the center frame section by which the right frame section could be located. Horizontal alignment is effected by means of two pads $G^{41}$ welded one to each of the left corner columns of the frame $G^1$ at the bottom. The bottom surfaces of the pads are machined adapting them to seat evenly upon the shoulder $A^{31}$ presented at the right side of the center frame section. When the frame sections are properly located with respect to each other, they are bolted tightly together as at $G^{42}$ (see Fig. 5). The shaft sections F and $G^{37}$ are then connected together by an endwise shiftable coupling $G^{43}$.

The threaded studs $G^6$ at the lower corner of the frame G enable the frame to be raised sufficiently to effect its horizontal alignment with the center frame section but after the frame sections have been bolted together, the studs can be backed up so that the weight of the right frame section is supported entirely by the center frame section.

Left or casting unit

The casting unit is supported by a frame section H which is likewise bolted to the center frame section at the left when the machine is assembled. The frame section H is built up of structural angles and bars, all welded together to produce a frame of sufficient strength to perform its intended function. As thus shown in Fig. 8, the frame section H includes front and rear columns $H^1$ and $H^2$, both of which are angles. The columns $H^1$ and $H^2$ are joined together at the top by a bar $H^3$ and also by a similar bar $H^4$ located somewhat lower down. A pair of spaced vertical struts $H^5$ and $H^6$ connect the frame members $H^3$ and $H^4$, thus adding strength to the frame section H at the top. Somewhat below the center of the frame section H, the columns are connected by an angle $H^7$, extending in a fore-and-aft direction, and this in turn is connected to the bar $H^4$ by a vertical angle strut $H^8$.

Figure 10:
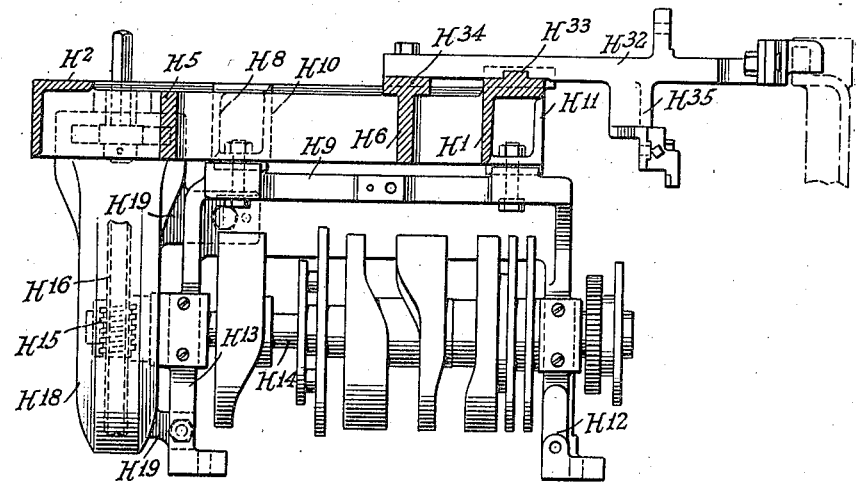
Fig. 10 is a horizontal sectional view on line 10—10 of Fig. 8.

All of the parts which enter into the casting unit are supported by or hung from the frame section H. Thus, there is a large casting $H^9$ in the form of a bracket which is bolted to the front column $H^1$ and also to the intermediate strut $H^8$ (Figs. 8, 9 and 10). The column $H^1$ and the vertical strut $H^8$, in the region of the bracket connections, are reinforced by short angle sections $H^{10}$ and $H^{11}$ whose legs, at their ends, are welded to the legs of the frame members $H^1$ and $H^8$ (Fig. 10).

The bracket $H^9$ is formed with two leftwardly extending arms, $H^{12}$ and $H^{13}$ supporting respectively, the front and rear bearings for the main cam shaft $H^{14}$ of the machine. As described in the copending Plastaras application Serial No. 377,364, the cam shaft $H^{14}$ is driven through the medium of a worm $H^{15}$ and worm wheel $H^{16}$, the worm wheel being mounted on the cam shaft at its rear end and the worm on a transverse shaft adapted to be clutch connected to a short section of shafting $H^{17}$ located in axial alignment with the main section of shafting F when the machine is assembled. The worm and worm wheel are mounted in a housing $H^{18}$ formed with forwardly extending lugs $H^{19}$ enabling it to be bolted to the rear arm $H^{13}$ of the supporting bracket $H^9$.

The bracket $H^9$ is formed at the top, to support a casting $H^{20}$ which presents guides for a fore-and-aft movable carriage $H^{21}$ on which the metal pot is mounted and, is formed at the bottom, to sustain a bracket $H^{22}$ in which there is rotatably mounted a second cam shaft $H^{23}$ on which a series of cams $H^{24}$ are arranged for actuating valves that control various machine functions (Figs. 8 and 9). At their left ends, the arms $H^{12}$, $H^{13}$ are formed with enlarged portions presenting vertical machined faces to which there is bolted a relatively large casting $H^{25}$ for supporting the swinging mold arm. The casting $H^{25}$ is formed at the bottom with fore-and-aft grooves to sustain and guide a fore-and-aft adjustable mold magazine $H^{26}$ described in Plastaras application Serial No. 355,434.

At this point, attention is called to the fact that the carriage $H^{21}$, together with the pot crucible and the pneumatically operated pump plunger mechanism, both of which are mounted on the carriage, is an independent sub-assembly unit, as is also the mold magazine $H^{26}$.

The mold arm bracket $H^{25}$ is formed with two lugs $H^{27}$ which serve to support a front corner column $H^{28}$ at the extreme left of the machine, the corner column being fashioned with lugs $H^{29}$ cooperating with the lugs $H^{27}$ properly to locate the column. This is essential since the column $H^{28}$ is provided with two pairs of hinge brackets $H^{30}$ and $H^{31}$, one pair for supporting the vise frame and the other pair for supporting the first elevator frame, both of which must be located properly with respect to the swinging mold arm and the metal pot. The column $H^{28}$ is a channel and the hinge brackets are welded thereto.

In the Plastaras application Serial No. 355,434, mention is made of the fact that the mold arm is swung upwardly from a vertical to a horizontal position whereupon it is moved forwardly into engagement with the matrix line, the mold arm cooperating in that movement with fixed devices which properly locate the mold in a horizontal casting position. In the Plastaras application Serial No. 383,133, which describes the vise frame in detail, mention is also made of fixed devices for properly locating the vise frame in its normal position as it is swung closed. Both of these devices are presented by a bracket arm $H^{32}$ which is mounted at the right of the frame H near the top, being tongued and grooved to a pad $H^{33}$ welded to the front column $H^1$ and fastened, by means of machine screws, to a second pad $H^{34}$ welded to the vertical bar $H^6$ (Figs. 8, 9 and 10). The arm $H^{32}$ extends forwardly beyond the front column $H^1$ and is formed with an extension $H^{35}$ projecting laterally toward the left and which presents the devices for locating the mold arm, the devices for locating the vise frame being presented at the extreme front of the arm.

It will be apparent now that since all of the devices entering into the casting unit assembly are positioned with reference to the frame section H, all of said devices will be properly located with respect to one another when the casting unit is completely assembled.

Figure 11:
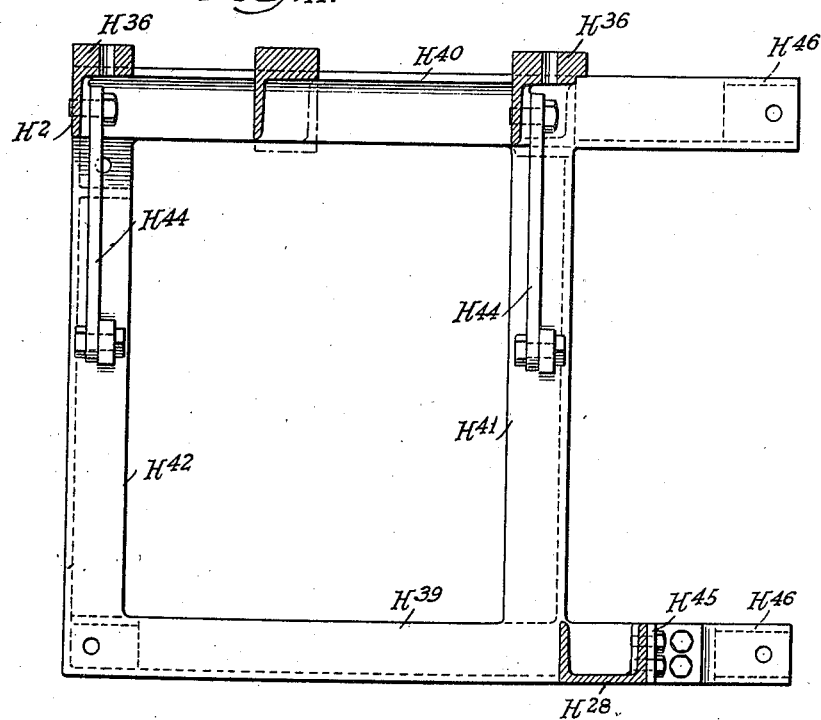
Fig. 11 is a horizontal sectional view on line 11—11 of Fig. 8.

When the complete machine is assembled, the frame section H supporting the casting mechanism is bolted to the center frame section at its left side. A reference plate (not shown), but which is mounted on the center frame section, serves to locate the two frame sections in their proper relative positions in a fore-and-aft direction, whereas the shoulder $A^{31}$ at the left side of the center frame section provides for proper horizontal alignment. Also for this purpose, the frame section H has welded to it at the right, a pair of metal pads $H^{36}$, one on each of the front and rear columns, the pads being adapted to engage the shoulder $A^{31}$ at the top in relatively positioning the parts (Figs. 5 and 11). Similar pads $H^{37}$, welded to the columns at the top, insure the same spacing of the frame sections from top to bottom. The frame section H is fastened to the center frame section by machine screws passing through the columns $H^1$, $H^2$ and the pads $H^{36}$, $H^{37}$ and which are threaded into the adjacent columns of the center frame section.

In order to support the frame section H during the assembly of the casting devices, there is provided a substantially square base frame $H^{38}$ consisting of two side members $H^{39}$ and $H^{40}$ connected together at the front and rear by transverse members $H^{41}$ and $H^{42}$, all the members being angles welded together at the joints (Figs. 8, 9 and 11). The righthand frame member $H^{40}$ is provided with a pair of upwardly projecting lugs $H^{43}$ facilitating its connection with the columns $H^1$, $H^2$ of the frame section H. The perpendicular relation between the frame section H and the base frame $H^{38}$ is maintained by a pair of bracing members $H^{44}$, connected between the columns $H^1$ and $H^2$ and the corresponding front and rear members of the base frame (Figs. 5 and 11). The channel column $H^{28}$ at the left, which supports the vise frame and the first elevator frame, extends downwardly to the base frame, being connected at its lower end, by means of machine screws, to an angle bracket $H^{45}$ mounted upon the left side member $H^{39}$. By thus tying the column to the base frame, any sagging tendency on the part of the brackets supporting the casting devices will be effectively prevented. The side members of the base frame extend forwardly beyond the hinge post or channel member $H^{28}$ in order to counteract a couple tending to tilt the entire casting assembly forwardly when the vise frame is swung open since then, the center of gravity of the unit is located forward of the hinge post.

At each corner of the base frame, there is a short angle section $H^{46}$ having its legs welded along their edges to the corresponding leg portions of the frame angles (Figs. 5, 9 and 11). Through each hollow square section thus resulting, there extends a screw $H^{47}$ which can be adjusted to elevate the entire frame from the floor the distance necessary to enable the pads $H^{36}$ to be seated on the ledges $A^{31}$. When assembly of the machine has been completed, the screws $H^{47}$ can be backed off the floor or left in engagement therewith as desired.

When the left frame section H supporting the casting unit has been attached to the center frame section, the horizontal shaft sections $H^{17}$ and F, which are respectively supported thereby, will be in axial alignment and may be connected together endwise by any suitable type of coupling device as at $H^{48}$ (Fig. 5).

*Front plate assembly*

Figure 14:
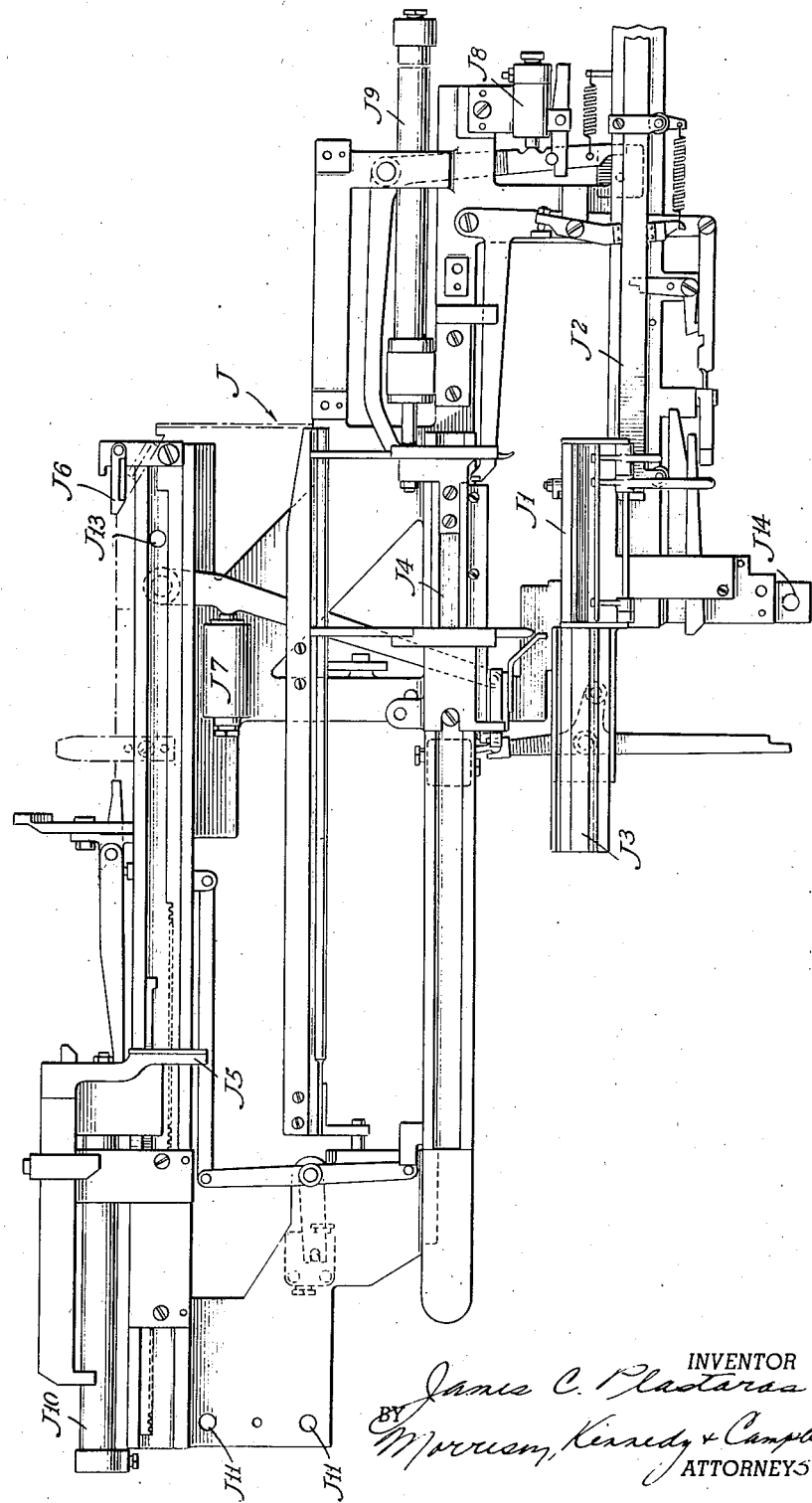
Fig. 14 is a front elevation of the front plate sub-assembly that supports the line transfer devices.

After the frame section H has been assembled with the center frame section and the casting devices installed, i. e., the mold arm, the mold magazine, the ejector mechanism, the main cam shaft unit, the metal pot and pump unit, all of which are fully described in the various Plastaras applications previously alluded to, there is installed the front plate J of the machine which is a sub-assembly unit (described in Plastaras application S. N. 377,364) and includes an assembler $J^1$ with its line resistant $J^2$, the intermediate channel $J^3$, the line transfer carriage $J^4$ for transferring the composed line from the assembler to the casting devices, and also the upper transfer carriage $J^5$ for transferring the line after casting from the first elevator to the second elevator, as well as the mechanism $J^6$ for separating the spacebands from the matrices and returning the spacebands to the spaceband magazine (Fig. 14). In addition to pneumatic devices J$^7$ and J$^8$ for inaugurating the line transfer operation, the front plate assembly J also includes a double acting, pneumatically operated cylinder and piston device J$^9$ for moving the transfer carriage J$^4$ in both directions and a similar double acting pneumatically operated cylinder and piston device J$^{10}$ for moving the upper line transfer carriage in both directions. Four bolts only are used for mounting the front plate assembly on the machine frame. Thus, at the left end of the assembly, there are two bolt holes J$^{11}$ which are adapted to register with similarly spaced holes J$^{12}$ near the top of the left corner post H$^{28}$ which supports the vise frame and the first elevator frame, the other two bolt holes J$^{13}$ and J$^{14}$ being located, one near the right end of the upper transfer carriage guide channel and which is adapted to register with a bolt hole J$^{15}$ in the forwardly extending bracket A$^{32}$ on the left front column of the main frame, and the other being located at the extreme bottom of the assembly and which is adapted to register with a bolt hole J$^{16}$ in a lug extending rightward from the bracket H$^{32}$ which presents the aligning devices for the mold arm and the vise frame (Figs. 5, 10 and 14). The front plate assembly, in place, is shown in phantom lines in Fig. 5.

Vise frame assembly

Figure 12:
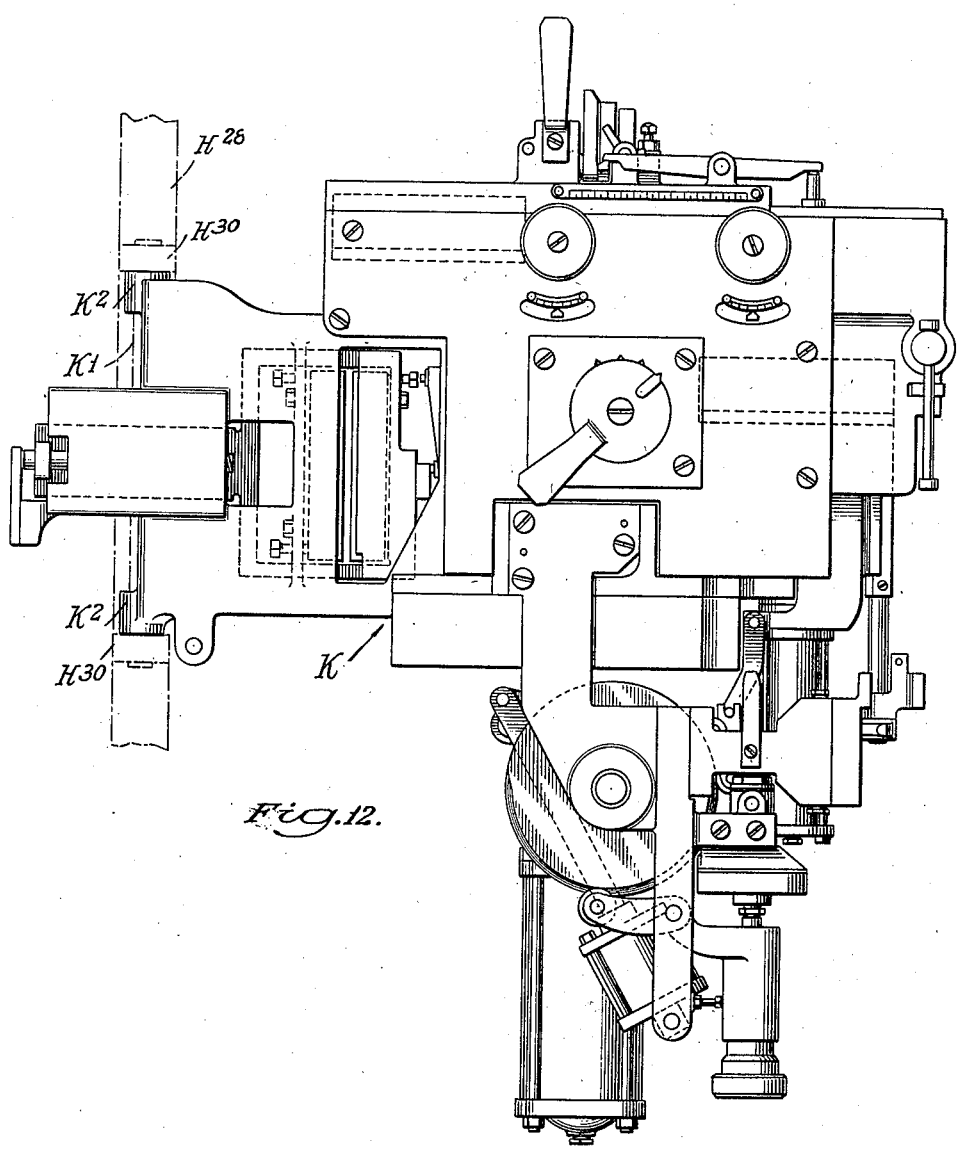
Fig. 12 is a front elevation of the vise frame sub-assembly.

The vise frame assembly K is shown in Fig. 12 and is fully described in Plastaras application S. N. 383,133. As previously stated, it is hinged to the column H$^{28}$ at the left of the frame section supporting the casting mechanism. The only major assembly operation, here, is the insertion of a hinge pin K$^1$ through the hinge lugs H$^{30}$ on the column H$^{28}$ and through a pair of lugs K$^2$ on the vise frame assembly which cooperate therewith. The vise frame assembly, in place, is shown in phantom lines in Fig. 8.

As set forth in the Plastaras application last mentioned, the vise frame assembly K contains the justifying devices with an individual pneumatically operated power device for actuating them. It also contains the pneumatically operated power devices for raising and lowering the righthand jaw into and out of operative position and for effecting such quadding operations of the jaws as are desired.

First elevator assembly

Figure 13:
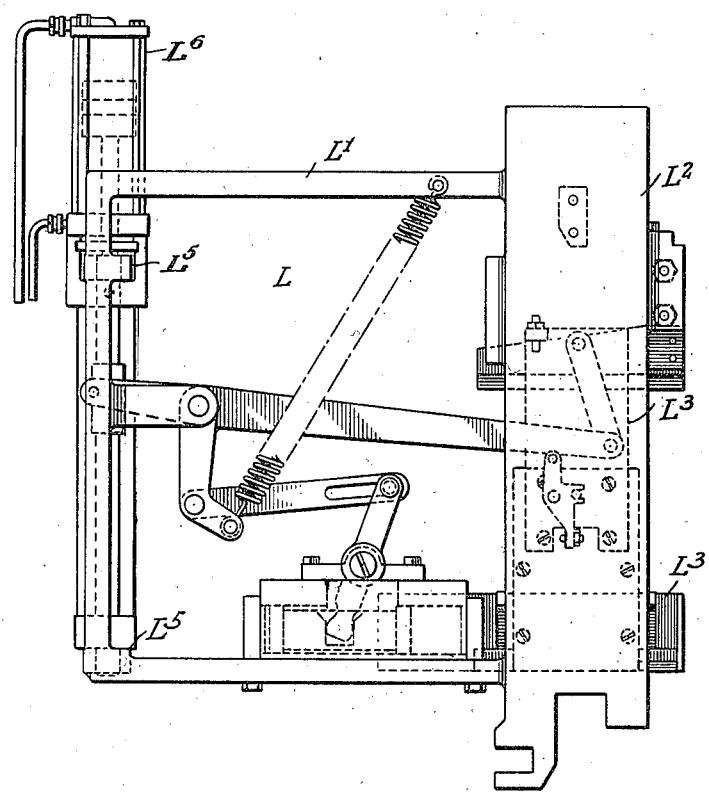
Fig. 13 is a front elevation of the first elevator sub-assembly.

Like the vise frame assembly, there is a first elevator subassembly unit L which is hinged to the column H$^{28}$ in a position immediately overlying the vise frame. The first elevator assembly unit L is shown in Fig. 13 and is fully described in the Plastaras application S. N. 377,364. Briefly, it consists of a welded frame L$^1$ having a portion L$^2$ at the right presenting guideways for a first elevator head L$^3$ arranged for vertical movement from a normal lower position where it receives the composed line from the line transfer mechanism to an intermediate or casting position and then, after the slug is cast, to a topmost position where the upper transfer mechanism removes the line from the elevator head for later distribution.

The first elevator assembly is mounted upon the column H$^{28}$ by means of a hinge pin L$^4$ which passes through lugs L$^5$ on the first elevator frame and which cooperate with the lugs H$^{31}$ on the column. As fully described in Plastaras application S. N. 377,364, the first elevator is raised and lowered by a double acting pneumatically operated cylinder and piston device L$^6$ having a piston arranged to reciprocate in the hinge pin L$^4$ which is made hollow for the purpose (Fig. 13).

Second elevator assembly

Figure 15:
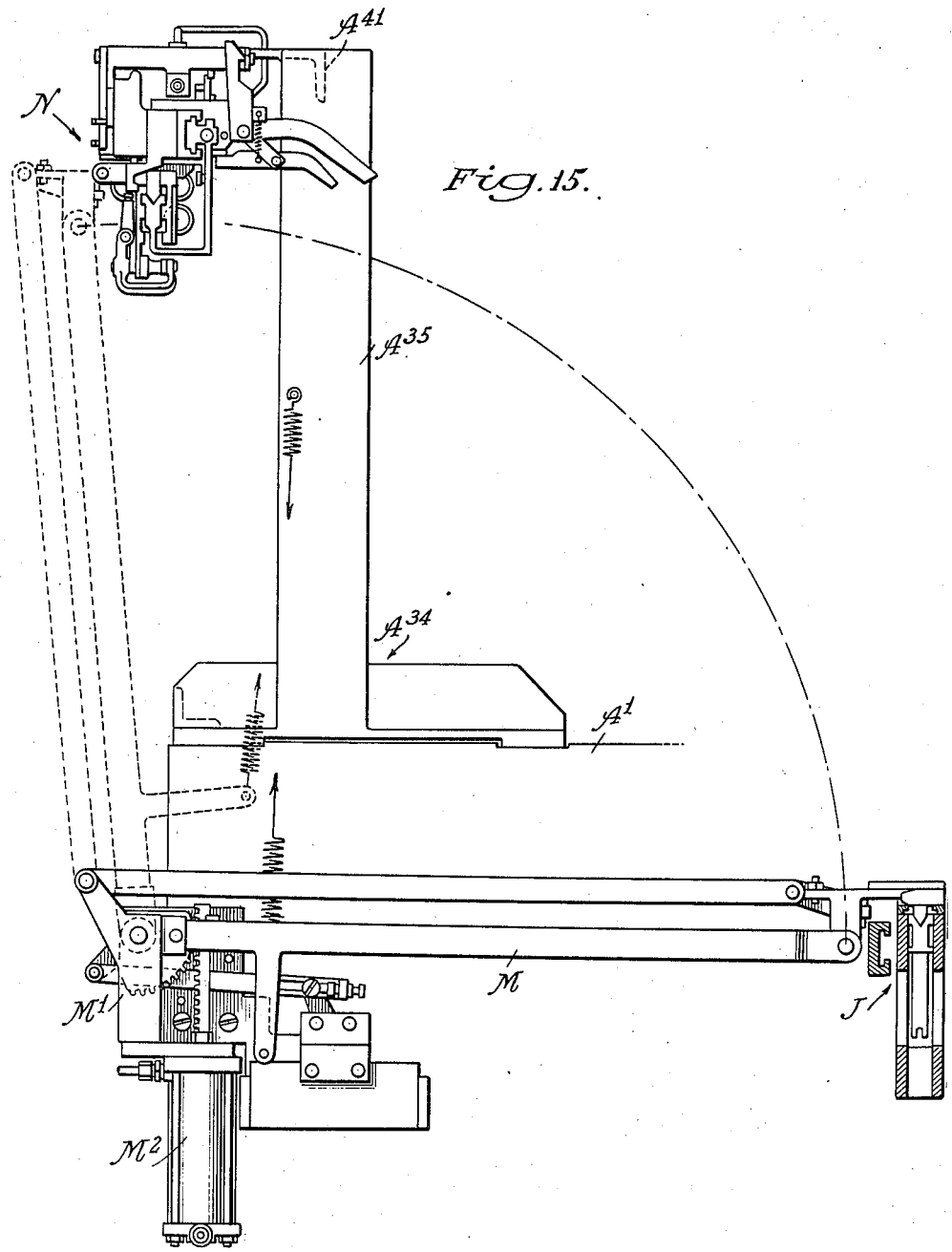
Fig. 15 is a left end elevation of the second elevator assembly and the distributor shifter assembly for transferring the line from the elevator for distribution.

A second elevator M for lifting the line of matrices from the upper line transfer position to a distributor mechanism N (both shown in Fig. 15 and described in Plastaras application S. N. 377,364) is mounted upon a bracket M$^1$ which also supports a double acting pneumatically operated cylinder and piston device M$^2$ for lowering the elevator to receive the line and raising it for transfer to the distributor. In assembling, it is necessary merely to bolt the bracket M$^1$ to the left rear column A$^{18}$ of the center frame section.

Distributor assembly

The distributor mechanism N is a sub-assembly which merely requires bolting to the brackets A$^{40}$ located atop the standards A$^{35}$ and A$^{37}$ on the center frame and to the bracket G$^{23}$ atop the standard G$^{21}$ on the frame supporting the auxiliary magazines. In addition to the usual mechanism comprising the distributor, i. e., the distributor bar, the distributor screws and the distributor box, the assembly in the instant machine also includes, as one of its component elements, a distributor shifter which is operated by an independent double acting pneumatically operated cylinder and piston device.

Complete machine assembly

The square box-like frames of the instant machine, coupled with the fact that substantially all of the operating parts are located within the confines of the frame, enable the entire machine to be panel enclosed. Thus, while not shown, in actuality the entire front of the machine with the exception of the magazines, the keyboard, the vise frame and the first elevator, is enclosed in panels which are secured to the front frame elements by means permitting their ready removal in the event access to the operating parts is desired. While the first elevator and the vise frame cannot be enclosed in panels secured to the main frame elements since, on occasions, it is desired to swing these frames open, nevertheless they are equipped with panels hiding most of the operating parts and which are designed to carry out the general panelling idea of the machine as a whole. The machine is also panelled at the right side and at the rear. The casting devices are enclosed at the side by a single roll panelling member which can be readily slid open when access to the devices is desired, and at the back, by a panel similar to those enclosing the rest of the machine. The frame supporting the casting mechanism is open at the top since it is frequently necessary to replenish the metal in the crucible.

Conclusion

From what has been said, it is clear that the unit assembly feature of the instant machine constitutes a radical departure from the methods that have heretofore been used in the construction of "Linotype" machines. It enables substantial savings to be made in the construction of the machine itself as well as in the cost of storing the machines (the individual assemblies being separately stored) and in the cost of shipping the machines to their ultimate destination. Insofar as shipping is concerned, the machine has great flexibility, since after a machine has been assembled for final testing before shipment, it can be left assembled and shipped for, say, local delivery where only one handling would be required, or knocked down into its component assembly units, the units being boxed or crated for shipment where much handling is necessary or where shipping space is an item of expense to be considered, as for instance, in shipping by train or boat.

In the accompanying drawings, the invention has been shown merely in preferred form and by way of example, but obviously many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. A typographical machine having a main frame made up of a plurality of sections, each frame section capable of independently supporting certain function-performing organs of the machine and each comprising corner columns with members tying them together, the columns of each frame section being located so that substantially all the machine organs not requiring manual operation are located within the confines of the frame structure.

2. A typographical machine according to claim 1, wherein each supporting frame or frame section is fabricated of structural shapes.

3. A typographical machine according to claim 1, wherein each supporting frame or frame section is fabricated of structural steel shapes welded together.

4. A typographical machine according to claim 1, wherein the main frame sections, when fastened together in predetermined relation, act properly to locate the machine organs supported thereby for mutual cooperation.

5. A typographical machine comprising a supporting frame structure, a plurality of independent assemblies comprising each a function-performing machine organ with a power operating device therefor, and means for mounting said assemblies on the supporting frame structure in a manner substantially to preclude the transmission, to the supporting frame structure, of the forces resulting from the operation of the power devices during a machine cycle of operation.

6. A typographical machine according to claim 5, wherein the supporting frame structure consists of relatively light structural steel shapes welded together.

7. A typographical machine according to claim 5, wherein the means for mounting the assemblies on the supporting frame structure insure that the assemblies will be located properly for mutual cooperation during a machine cycle of operation.

8. A typographical composing and casting machine equipped with a main matrix magazine from which matrices are released and composed in line, keyboard mechanism for releasing the matrices from the magazine, and casting mechanism including means for presenting the composed line to the face of a slotted mold and for filling the mold with molten metal to cast a slug against the composed line of matrices, and including, in combination, individual fabricated metal frameworks, one for supporting the magazine and the keyboard mechanism, and another for supporting the casting mechanism, and means for connecting both frameworks together in predetermined relation, thereby to locate the casting mechanism in a position to receive the composed line of matrices released from the magazine under the control of the keyboard.

9. A typographical composing and casting machine equipped with a main matrix magazine from which matrices are released and composed in line, keyboard mechanism for releasing the matrices from the magazine, casting mechanism including means for presenting the composed line to the face of a slotted mold and for filling the mold with molten metal to cast a slug against the composed line of matrices, and an assembly including means in which the line is composed and means for transporting the composed line of matrices to the casting mechanism, and including, in combination, individual fabricated metal frameworks, one for supporting the magazine and the keyboard mechanism and another for supporting the casting mechanism, means for connecting both frameworks together in predetermined relation, thereby to locate the casting mechanism in a position to receive the composed line of matrices released from the magazine under the control of the keyboard and mounting means for said assembly conjointly supported by both said frameworks.

10. A machine according to claim 8 equipped, in addition to the main matrix magazine, with an auxiliary matrix magazine, and including, in the combination, an individual fabricated metal framework for supporting the auxiliary magazine, and means for connecting said framework in predetermined relation to the framework supporting the main magazine, thereby to locate the auxiliary magazine in a position enabling the release of matrices therefrom under the control of the keyboard mechanism.

11. A typographical composing and casting machine equipped with a channeled matrix magazine from which matrices are released and composed in line, keyboard mechanism for releasing the matrices, casting mechanism for presenting the composed line to the face of a slotted mold adapted to be filled with molten metal to cast a slug against the composed line, mechanism for transferring a composed line to the casting mechanism and mechanism for distributing the matrices of the composed line to the channels of the magazine from which they started, and including, in combination, individual fabricated metal frameworks, one for supporting the magazine, the keyboard mechanism and the distributing mechanism, and another for supporting the casting mechanism, and means for connecting both frameworks together in predetermined relation, thereby to locate the casting mechanism in a position to receive the composed line of matrices released from the magazine under the control of the keyboard and to enable the composed line to be transported from the casting mechanism to the distributing mechanism.

12. A typographical composing and casting machine equipped with a channeled matrix magazine from which matrices are released and composed in line, keyboard mechanism for releasing the matrices, casting mechanism for presenting the composed line to the face of a slotted mold adapted to be filled with molten metal to cast a slug against the composed line, mechanism for distributing the matrices of the composed line to the channels of the magazine from which they started and an assembly including means in which the line is composed, means for transporting the composed line to the casting mechanism and means assisting in transporting the line from the casting mechanism to the distributing mechanism, and including, in combination, individual fabricated metal frameworks, one for supporting the magazine, the keyboard mechanism and the distributing mechanism and another for supporting the casting mechanism, means for connecting both frameworks together in predetermined relation, thereby to locate the casting mechanism in a position to receive the composed line of matrices released from the magazine under the control of the keyboard and to enable the composed line to be transported from the casting mechanism to the distributing mechanism, and mounting means for said assembly conjointly supported by both said frameworks.

13. A machine according to claim 11 equipped, in addition to the main matrix magazine, with an auxiliary matrix magazine, and including, in the combination, an individual fabricated metal framework for supporting the auxiliary magazine, and means for connecting said framework in predetermined relation to the framework supporting the main magazine, thereby to locate the auxiliary magazine in a position enabling the release of the matrices therefrom under the control of the keyboard mechanism.

14. A machine according to claim 11 equipped, in addition to the main matrix magazine, with an auxiliary matrix magazine, and including, in the combination, an individual fabricated metal framework for supporting the auxiliary magazine, and means for connecting said framework in predetermined relation to the framework supporting the main magazine, thereby to locate the auxiliary magazine in a position enabling the release of the matrices therefrom under the control of the keyboard mechanism, the framework supporting the auxiliary magazine being arranged to give additional support to the distributing mechanism which is extended to enable matrices to be distributed to the auxiliary magazine as well as to the main magazine.

15. A typographical composing and casting machine including, in combination, a plurality of main assembly units connectible one alongside the other to form the complete machine, each of said main assembly units comprising an individual fabricated framework adapted to support the function-supporting organs comprising that unit.

16. A machine according to claim 15, wherein one main assembly unit includes a magazine shift frame which is raised and lowered by an independent power operated device constituting part of that main assembly unit.

17. A machine according to claim 15, wherein one of the main assembly units includes as a sub-assembly unit a power operated keyboard.

18. A machine according to claim 15, wherein one of the main assembly units includes as a sub-assembly unit a matrix distributor with a distributor box and an independently powered shifter for causing matrices to enter the distributor box.

19. A machine according to claim 15, wherein one of the main assembly units includes a plurality of sub-assembly units constituting the casting mechanism of the machine.

20. A machine according to claim 15, wherein one of the main assembly units includes a plurality of subassembly units constituting the casting mechanism of the machine and wherein one of the subassembly units included in the casting mechanism assembly is the vise frame which includes the line justifying devices and the power means for operating them.

21. A machine according to claim 15, wherein one of the main assembly units includes a plurality of subassembly units constituting the casting mechanism of the machine and wherein one of the subassembly units included in the casting mechanism assembly is the first elevator and the power means for operating it.

22. A machine according to claim 15, wherein one of the main assembly units includes a plurality of subassembly units constituting the casting mechanism of the machine and wherein one of the subassembly units included in the casting mechanism assembly is the crucible pot, together with the metal pump and the power means for operating the pump.

23. A machine according to claim 15, wherein one of the main assembly units includes a shift frame adapted to support auxiliary matrix magazines, and power means for raising and lowering the shift frame.

24. A machine according to claim 15, wherein each main assembly unit includes a plurality of sub-assembly units, each capable of individual assembly for later assembly in the main unit.

25. A machine according to claim 15, wherein the framework of one main assembly unit serves as a foundation for the support of the remaining main assembly units.

26. A typographical composing, casting and distributing machine including, in combination, three main assembly units, one unit comprising a fabricated frame structure supporting a power operated magazine shift frame and a keyboard mechanism, another unit comprising a fabricated frame structure supporting a power operated auxiliary magazine shift frame, and the third unit comprising a fabricated frame structure supporting the casting mechanism, all of said assembly units being adapted for independent assembly and for later assembly together to form a unitary structure, means for locating the frames of the assembly units relatively with respect to each other whereby, when connected together, said assemblies will be positioned for mutual cooperation, a sub-assembly unit comprising means for receiving a line as it is composed, means for transporting the composed line to the casting mechanism and means for transporting the line from the casting mechanism for later distribution, said sub-assembly unit being adapted for conjoint support by the frame structures supporting the casting mechanism and the main magazines, and a sub-assembly unit comprising a distributing mechanism with shifter means for transferring a line of matrices thereto, and adapted for conjoint support by the frame structures supporting the main magazines and the auxiliary magazine.

JAMES C. PLASTARAS.